March 18, 1930.  E. L. FONSECA  1,750,749
LIQUID HEATER CONTROL MECHANISM
Filed Nov. 20, 1925
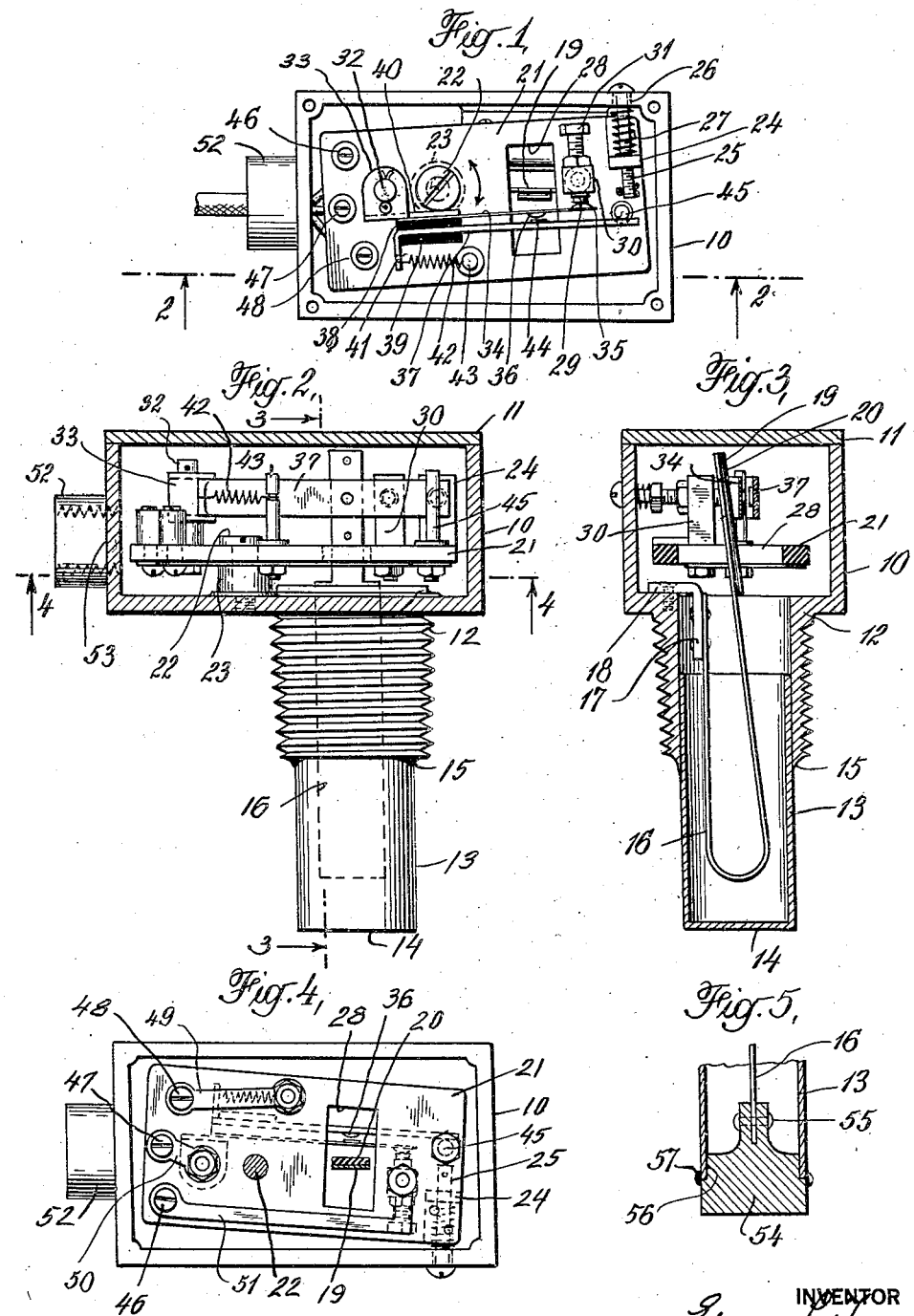
INVENTOR
Edward L. Fonseca
BY
Pennie, Davis, Marvin & Edmonds
ATTORNEYS Patented Mar. 18, 1930

1,750,749

UNITED STATES PATENT OFFICE

EDWARD L. FONSECA, OF NEWARK, NEW JERSEY, ASSIGNOR TO THE WILCOLATOR COMPANY, OF NEWARK, NEW JERSEY, A CORPORATION OF DELAWARE

LIQUID-HEATER-CONTROL MECHANISM

Application filed November 20, 1925. Serial No. 70,239.

This invention relates to thermostatic control devices which afford an automatic regulation of the supply of fuel delivered to a burner for consumption therein, so that a uniform predetermined temperature may be maintained. More particularly the present device is intended for use in connection with a heater for liquids in which a quantity of liquid may be heated either by the combustion of fuel in the gaseous or liquid form or by electric current, and the device permits the supply of fuel or the flow of current to be regulated so that the liquid may be maintained within a narrow temperature range.

The device is of the type in which a thermostatic element is employed which is sensitive to temperature variations and which undergoes changes in form as the temperature to which it is exposed fluctuates. The movements of the element thus brought about are employed in the making and breaking of electric circuits which operate relays or other similar devices for actuating a valve, controlling the supply of fuel to the burner or a switch by which the flow of current is controlled in the event that the liquid is to be heated electrically. The object of the invention is to produce a device of this type which is simple and compact, reliable in operation due to the use of a few simple parts which are not subject to any considerable wear, and readily adjustable so that it may be easily set for the maintenance of different temperatures.

The operative elements of the device are disposed within a housing, a portion of which is inserted through the wall of the tank or other receptacle which contains the liquid to be heated, and a thermostatic element of suitable form is mounted in the housing in such manner as to expose it to the temperature of of the liquid. This thermostatic element has a portion which moves to different positions as the liquid temperature fluctuates, and the device includes contacts suitably mounted and arranged so that the movements of this portion of the element will cause the making or breaking of circuits which control the actuation of the valve which governs the supply of fuel. The device includes adjusting means so that the temperature of the liquid may be maintained at any selected value, although a slight fluctuation range is permitted, but this latter range may be reduced to a minimum should occasion arise. The adjustment of the mechanism for different temperatures is a simple operation which involves moving the contact members bodily with reference to the movable portion of the element, but without varying their relative positions, and the construction of the contact members is such that the device may be set for different temperatures, even though the thermostatic element is in expanded condition, without injuring the thermostatic element.

In the accompanying drawings there are shown different views of the preferred embodiment of the invention, and in these drawings, Fig. 1 is a top plan view of the device with the cover of the housing removed, Fig. 2 is a sectional view through the housing on the line 2—2 of Fig. 1, Fig. 3 is a similar view on the line 3—3 of Fig. 2, and Fig. 4 is a sectional view on the line 4—4 of Fig. 2.

Fig. 5 is a sectional view of a detail showing a different type of mounting for the thermostatic element.

Referring now to these drawings, the device is shown as including a housing 10 which may be of any suitable material, preferably of a relatively non-corrodible metal, such as brass, and generally rectangular in shape. This housing is provided with a cover plate 11, which may be secured in any convenient manner, as by screws at the corners. From the rear wall of the housing there projects a threaded hollow boss 12, in the end of which is secured a tubular member 13, having one end 14 closed. This tubular member is inserted within the boss and secured therein in any convenient manner, as by brazing, at 15. The tubular member and boss are watertight, and the construction is such that a threaded opening may be made in the wall of the tank to contain the liquid to be heated, and the boss may be threaded in this opening so that no leakage will result and packing is not necessary.

A thermostatic element 16 is secured at one end by riveting or other suitable means, to one leg 17 of an L-shaped bracket, the other end 18 of which is secured to the side wall of the housing. The leg 17 lies within the hollow boss and the thermostatic element extends downwardly into the tubular member 14, then curves upwardly and at its free end 19 projects into the housing beyond the end of the boss. The free end 19 of the element carries a strip of insulation 20 secured thereto in any convenient manner. The thermostatic element is preferably formed of a pair of metals having different rates of expansion welded together throughout their length, and the construction is such that when the element is exposed to progressively increasing temperatures, its free end 19 will move to the right, as shown in Fig. 3. The extent of such movement will depend on the temperature to which the element is exposed.

Mounted within the casing is a base 21 of insulating material, such as hard rubber or the like, through which extends a headed screw 22, the lower end of which is threaded into an opening in the wall of the housing. Beneath the base 21 encircling the screw, is a thick washer 23. The dimensions of the base 21 are less than the corresponding dimensions of the housing 10, and the screw 22 is placed slightly off center lengthwise of the base. The base is free to swing a slight distance within the housing, and in order that it may be properly positioned within the housing, the base carries at one end an upstanding bracket 24, in which is threaded an adjustment screw 25 which extends through an opening 26 in the wall of the casing, this opening being somewhat larger than the diameter of the screw so that the latter has a loose fit. A spring 27 encircles the screw and bears at one end against the interior of the casing and at the other against the face of the bracket. With this arrangement the position of the base may be adjusted, as may be desired, by turning the screw 26. This may be done without removing the cover plate of the housing as the screw extends through the side wall of the latter.

The base 21 is provided with a suitable aperture 28 which overlies the hollow offset extension formed by the boss 12 and the tubular member 13, and through this aperture extends the free end of the thermostatic element. Adjacent the aperture on one side thereof, the base carries a contact member 29 mounted on a suitable standard 30, the contact proper being carried on the end of an adjustment screw 31 so that its position in the standard may be regulated. On the other side of the aperture the base carries a pin 32, provided with a stirrup 33. Secured at one end to this stirrup is an arm 34 of a thin springy metal, and this arm carries at its free end a contact 35, adapted to be brought into engagement with the stationary contact 29. The arm extends across the aperture 28 and lies in the path of movement of the free end of the thermostatic element. Spaced along the arm from the contact 35, and lying substantially in the path of travel of the free end of the element, is a contact 36.

Also mounted at one end of the stirrup is a second arm 37, a block of insulation 38 being interposed between the ends of the arms 34 and 37 so that the two are separated electrically from each other. A similar block of insulation 39 is carried on the outer face of the arm 37, and the two arms are mounted on a portion 40 extending from the stirrup by means of rivets which pass through the blocks of insulation but which do not contact with the arms. The fixed end of the arm 39 terminates in a hook 41, to which is secured a spring 42, the other end of which is connected to a pin 43 extending upwardly from the base. The arm 37 carries a contact 44 which lies substantially in alignment with the contact 36 on the arm 34. The spring 42 tends to rock the stirrup in a counter-clockwise direction, as shown in Fig. 1, and this movement is limited by means of a pin 45, extending upwardly from the base and engaged by the end of the arm 37. The arm 34 is mounted so that it lies not quite parallel to the arm 37, and when the parts are in normal position with the arm 37 bearing against the stop pin, the arm 34 will lie so that its contact 35 bears against the stationary contact 29 and contacts 36 and 44 will be out of engagement.

At the end of the base, beyond the pin 32, are terminal posts 46, 47, and 48, and as shown in Fig. 4, the terminal 48 is connected on the under side of the base by a metallic strip 49 to the pin 43 and this terminal is thus connected electrically with the contact 44 through the strip 49, the pin 43, spring 42, and arm 37. The terminal member 47 is connected by a strip 50 to the pin 32, on which the stirrup 33 is mounted, and this terminal is therefore electrically connected to contacts 35 and 36 through strip 50, pin 32, stirrup 33, and arm 34. As the arms 34 and 37 are insulated from each other a direct electrical connection between terminals 47 and 48 can only be established through contacts 36 and 44.

The third terminal 46 is connected by a strip 51 to the standard in which the stationary contact 29 is mounted, and a hollow boss 52 projects from the wall of the housing at one end and through the opening 53 in this boss the ends of the wires may be led to be connected to the several contacts. The wiring is not illustrated, but it may lead to an electrical relay or solenoid-actuated device of the usual type by which a valve controlling the flow of fuel to a burner may be actuated.

In Fig. 5 there is illustrated a portion of the mechanism in which a straight thermostatic element is to be employed instead of the curved element shown in Fig. 3. In this type of device the end of the element 16 is mounted in a recess in a cap 54, being held there by a rivet 55, or in any other suitable way. The cap 54 has a circumferential recess 56 in which the end of the tube 13 is received, and the cap is welded or otherwise secured in the end of the tube, as indicated at 57.

In operation, the device is installed in the wall of the tank containing the liquid to be heated, and the terminals are connected to devices for opening and closing the fuel valve governing the flow of fuel to the burners. The device is adjusted at the factory for the temperature which it is to maintain, this adjustment being carried out by setting the adjustment screw 25 and thus moving the base so that when the predetermined temperature is reached the free end of the thermostatic element will have moved forward a sufficient distance to engage the first arm 34 and move it sufficiently to open the contacts 29 and 35. The contact 29 is adjusted so that the contact 35 will lie in engagement with it with the arm 34 unbent, and this movement of the arm is effected without causing the stirrup to swing. After the device is adjusted to the proper temperature and put in position in the tank, the fuel valve is opened and the burner lighted in the usual way. When the temperature of the liquid being heated exceeds the predetermined value, the free end of the thermostatic element moves into engagement with the arm 34 and opens contacts 29 and 35. Ordinarily the device will be arranged so that in such opening no change in the position of the fuel valve is effected, but upon a continued movement of the free end of the thermostatic element, due to a further increase in temperature, contacts 36 and 44 are brought into engagement, thus establishing an electric circuit which will shut off the fuel valve. As the temperature of the liquid cools, the free end of the thermostatic element will move backwardly and the arm 34, due to its spring action, will follow it, thus first breaking contacts 36 and 44. This causes no action of the electrical devices operating the valve, but the further movement of the free end of the element, resulting in contacts 29 and 35 being brought into engagement, will cause a circuit to be established which will actuate the electrical devices to open the fuel valve.

With the arrangement described, it will be observed that no action results from the breaking of contacts 29 and 35, and the flow of fuel continues until contacts 36 and 44 are engaged. Also, as the temperature falls, when contacts 36 and 44 are disengaged, no action of the valve controlling devices results, but the valve is only opened again when contacts 29 and 35 again come into engagement. The purpose of this arrangement is to delay the action of the valve controlling devices to a slight extent so that slight variations in the fuel supply or in the quality of the fuel, resulting in slight temperature changes, will not result in an action of the valve controlling means, but the temperature of the liquid may have a slight fluctuation without affecting the valve. This avoids bringing the valve actuating devices unnecessarily into use, and thereby lengthens their usefulness. The range of such fluctuation is small and may be regulated as may be desired by adjusting the position of the stationary contact 29.

It will be observed that the arm 37 normally lies in fixed position and that the arm 34 may be moved relatively to it by the action of the free end of the element. However, as soon as arm 34 is bent slightly, so that contacts 36 and 44 are engaged, any further movement of the free end of the thermostatic element will cause both arms to be swung together about the pin 32. The purpose of this arrangement is to prevent injury to the delicate thermostatic element in resetting. If, for example, the element is set to maintain a temperature of 200° in the liquid, and this temperature is reached, the element will have expanded so that its free end lies against the arm 34 and the contact 36 carried by the latter is engaged with contact 44. If now, with the element in such expanded condition, it is desired to reset the device for a lower temperature, this would be done by operating the adjustment screw so as to swing the end of the base toward the normal position of the free end of the element, but since the latter is in expanded condition at the time of such resetting, such movement of the base would cause the arms to bear against the end of the element, and if the arms were fixed, could only be carried out by bending the element. Since the arms are free to swing against the action of the spring 42, such resetting simply means that the spring 42 is stretched slightly so as to permit a greater swinging movement about the pin 32. Thus the device may be at once reset, regardless of the condition of the element, without causing injury to the latter.

It will be observed that the contact 36 is spaced along the arm 34 from the contact 35 and lies directly in the path of travel of the free end of the thermostatic element. With contact 36 at this point, the movement of the free end of the element insures a certain contact between the contacts 36 and 44, and also prevents the spring 34 from bowing to any considerable extent. This spring is of very light metal and the presence of the contacts midway of its length prevents the end of the element from bending the spring, except near the fixed end of the spring. If the contact 36 were placed behind the contact 35 at the end of the spring, the engagement of the spring by the free end of the element might easily result in a bowing of the spring such that contacts 35 and 29 would remain in engagement long after their engagement should have been broken. With the present arrangement, such an action cannot take place.

I claim:

1. A thermostatic control device comprising the combination of a thermostatic element having a portion movable to different positions in accordance with temperature variations, a base, a stationary contact carried by the base, a movable arm mounted on the base and carrying a pair of spaced contacts, one of which normally engages the stationary contact, a second movable arm mounted within the casing and carrying a contact adapted to be engaged by the second contact carried by the first mentioned movable arm, the first movable arm lying in the path of travel of the movable portion of the thermostatic element and being movable thereby both relative to the second movable arm and also with the latter, and means for moving the base to different positions of adjustment to vary the action of the thermostatic element upon the movable arms.

2. A thermostatic control device comprising the combination of a thermostatic element having a portion movable to different positions in accordance with temperature variations, a base, a stationary contact mounted on the base, a movable arm mounted on the base and carrying a pair of spaced contacts, the first contact being normally in engagement with the stationary contact, this movable arm lying in the path of travel of the movable portion of the thermostatic element with its second contact substantially in alignment with the direction of movement of the element, a second movable arm mounted on the base and carrying a contact adapted to be engaged by the second contact carried by the first mentioned movable arm, the first arm being movable relative to the second arm and also movable simultaneously with the latter under the action of the element, and means for moving the base to different positions of adjustment to vary the temperature at which the first movable arm is engaged by the thermostatic element.

3. A thermostatic control device comprising the combination of a thermostatic element having a fixed end and a free end, the latter end being movable to different positions in accordance with temperature variations, a base, a stationary contact mounted on the base, an arm movably mounted on the base and carrying a contact normally engaging the stationary contact, and a second contact spaced therefrom and lying in the path of travel of the free end of the element, a second arm movably mounted on the base and carrying a contact adapted to be engaged by the second contact on the first arm, the two arms being so arranged that the movement of the free end of the element initially causes the first arm to move away from the stationary contact until the second contact carried on said arm is in engagement with the contact carried on the second arm, and then causes the arms to be moved simultaneously with their contacts engaged, and means for adjusting the position of the base relative to the thermostatic element to vary the temperature at which the free end of the element will engage said first movable arm.

4. A thermostatic control device comprising the combination of a thermostatic element having a fixed end and a free end, a base, a stationary contact mounted on the base, a movable contact normally held in definite spaced relation to the stationary contact, but movable away from the latter, an arm interposed between the contacts and itself carrying a pair of contacts, one of which is normally in engagement with the stationary contact, and the other in position to be brought into engagement with the movable contact by the action of the thermostatic element, means tending to hold the arm with one contact engaged with the stationary contact, and means for adjusting the position of the base relative to the thermostatic element to vary the temperature at which the free end of the latter will engage the arm.

5. A thermostatic control device comprising the combination of a housing, a thermostatic element within the housing having a fixed end and a free end, a base having an aperture through which the free end of the element extends, a stationary contact mounted on the base, a movable arm mounted on the base and carrying a pair of contacts, the first of which normally lies in engagement with the stationary contact, the second contact being spaced therefrom, an arm mounted on the base and carrying a contact normally out of engagement with the second contact on the first arm, means for holding the first arm with its contact in engagement with the stationary contact and the second arm with its contact spaced from the second contact on the first arm, and an adjustment device operable to change the position of the base relative to the free end of the thermostatic element to vary the temperature at which the arms will be acted upon by the element.

6. In a thermostatic control device, the combination of a thermostatic element having a free end and a fixed end, a pair of arms pivotally mounted to swing about the same pivot and mounted substantially parallel but in spaced relation, a spring arranged to hold both arms against movement in one direction, and a pair of contacts carried by said arms and adapted to be closed by the action of the free end of the thermostatic element in accordance with temperature changes.

7. In a thermostatic control device, the combination of a thermostatic element having an end movable to different positions in accordance with temperature changes, a pair of arms mounted to swing about a single pivot, these arms lying substantially parallel but in spaced relation, a spring holding the arms yieldingly against movement in one direction about the pivot, a pair of contacts carried by the opposed faces of the arms and lying in the path of travel of the free end of the thermostatic element, a contact carried by one of said arms beyond its contact first mentioned and a stationary contact with which the second contact carried by the arm is normally engaged.

8. In a thermostatic control device, the combination of a thermostatic element having a movable portion taking different positions in accordance with temperature changes, a movable arm carrying spaced contacts, a stationary contact with which one of the contacts on the said movable arm is normally engaged, and a second movable arm carrying a contact adapted to be engaged by the other of the contacts on the first movable arm, the first movable arm lying in the path of travel of the movable portion of the thermostatic element and being movable thereby both relative to and with the second movable arm.

9. In a thermostatic control device, the combination of a housing having a wall, an opening through the said wall, a tubular extension connected to the said wall and communicating with the interior of the housing through the said opening, this tubular extension being closed at its free end, a base within the housing movably mounted on the said wall and having an aperture through it in alignment with the tubular extension, a thermostatic element within the extension and projecting into the housing and through the aperture in the base, this thermostatic element having a portion within the housing movable in a plane parallel to the plane of movement of the base, a movable arm carried by the base independently of the thermostatic element and extending across said aperture in position to be engaged by the movable portion of the element to partake of the movement thereof, and means for adjusting the position of the base within the housing for determining the temperature at which the arm will be moved from normal position by the movable portion of the thermostatic element.

10. A thermostatic control device which comprises a thermostatic element having a fixed part and a free end, the latter assuming different positions as the element is subjected to varying temperatures, a base having an aperture through which the free end of the element projects, the remainder of the element lying at one side of the plane of the base, a stationary contact mounted on the base, a movable arm on the base carrying a contact adapted to engage the stationary contact, this arm being disposed in position to be engaged and moved by the free end of the element, and means for shifting the base with relation to the element to vary the temperature at which the movable arm will be engaged by the free end of the element.

11. A thermostatic control device which comprises a thermostatic element having a fixed part and a free end, the latter assuming different positions as the element is subjected to varying temperatures, a base having an aperture through which the free end of the element projects, the remainder of the element lying at one side of the plane of the base, a stationary contact mounted on the base at the side opposite to that on which the fixed part of the element lies, a movable arm on the base adjacent the stationary contact and carrying a contact adapted to engage the stationary contact, this arm being disposed in position to be engaged and moved by the free end of the element, and means for shifting the base with relation to the element to vary the temperature at which the movable arm will be engaged by the free end of the element.

12. A thermostatic control device which comprises a thermostatic element having a fixed part and a part movable as the element is subjected to varying temperatures, a base extending substantially transverse to the element and having an opening through which the movable part of the element extends, a stationary contact mounted on the base, a movable arm on the base carrying a contact which may engage the stationary contact, this arm being mounted independently of the thermostatic element but in position to be engaged and moved by the movable part thereof, and means for shifting the base relative to the element to vary the temperature at which the movable arm will be moved by the movable part of the element.

13. A thermostatic control device which comprises a thermostatic element having a fixed part and a part movable as the element is subjected to varying temperatures, a base extending substantially transverse to the element and having an opening through which the movable part of the element extends, a stationary contact mounted on the base, a contact-carrying arm on the base adapted to be moved in the plane of movement of the movable part of the element, this arm being mounted independently of the element but in position to be engaged and moved by the movable part thereof and the contact on said arm being adapted to engage the stationary contact, and means for shifting the base relative to the element to vary the temperature at which the movable arm will be moved by the movable part of the element.

14. A thermostatic control device comprising a thermostatic element having a part movable to different positions in accordance with temperature changes, a base lying substantially transverse to the longitudinal axis of the element and having an opening through which said movable part extends, a stationary contact mounted on the base, a movable arm mounted on the base and carrying a contact adapted to engage the stationary contact, this arm extending across said opening in position to be engaged and moved by the movable part of the element, and means for moving the base relative to the element to vary the distance between the arm and the movable part of the element.

15. A thermostatic control device comprising the combination of a casing having an opening in one wall thereof, a tube mounted on the casing in communication with the interior thereof through said opening, the free end of the tube being closed, a thermostatic element mounted with its major part within the tube, this element having a part extending into the casing through the opening, the said part being movable as the element is subjected to varying temperatures, a base within the casing having an aperture through which the movable part of the thermostatic element extends, an arm mounted on the base to extend across the aperture therein, this arm being independent of the thermostatic element but lying in position to be engaged and moved by the movable part of the element, and means for shifting the base with reference to the element to vary the temperature at which the movable part of the element will engage and cause a movement of the arm.

16. A thermostatic control device comprising the combination of a casing, a neck extending from one wall thereof, a tube mounted within the neck and projecting beyond it, the free end of the tube being closed and the interior of the tube being in communication with the interior of the casing through the neck, a thermostatic element mounted with its major part lying within the tube, this element having a part extending through the neck into the casing, said part being movable as the element is subjected to varying temperatures, a base within the casing having an opening through which the movable part of the element extends, a stationary contact on the base, an arm mounted on the base and carrying a contact adapted to engage with the stationary contact, this arm extending across the opening in the base in position to be engaged and moved by the movable part of the element, and means for moving the base relative to the element to vary the distance between the arm and the movable part of the element.

17. A thermostatic control device comprising the combination of a casing, having a pair of openings in the walls thereof, a tube mounted on the casing with its interior in communication through one of the openings with the interior of the casing, the free end of the tube being closed, a thermostatic element mounted with its major part within the tube, this element having a part lying within the casing and movable as the element is exposed to varying temperatures, a base within the casing having an aperture through which the movable part of the element extends, a stationary contact on the base, a movable arm mounted on the base and carrying a contact adapted to engage the stationary contact, this arm extending across the aperture in position to be engaged and moved by the movable part of the element, a closure for the casing, means for shifting the base within the casing relatively to the thermostatic element to vary the distance between the arm and the movable part of the element, and terminals on the base connected electrically with the stationary contact and the movable arm, these terminals being adapted to be connected to conductors entering the casing through the second other opening in the walls thereof.

18. A thermostatic control device comprising a thermostatic element having a part movable to different positions in accordance with temperature changes, a base having an aperture through which the movable part of the element extends, a movable arm on the base extending across the aperture in position to be engaged by the movable part of the element, insulating means for preventing an electrical connection between said arm and the element when the two are in contact, and means for shifting the base bodily to vary the distance between the arm and the movable part of the element.

19. A thermostatic control device which comprises a casing having an externally threaded neck projecting from one wall thereof, a tube mounted within the neck with the interior of the tube in communication with the interior of the casing through the neck, the free end of the tube being closed, a thermostatic element mounted with its major part lying within the tube and having a part extending through the neck into the casing, the said part being movable as the element is exposed to varying temperatures, a base within the casing having an aperture through which the movable part of the element extends, a stationary contact on the base, a movable arm mounted on the base and carrying a contact adapted to be engaged with the stationary contact, this arm extending across the aperture in the base through which the movable part of the element extends and in position to be engaged and moved by said part of the element, and means for moving the base relative to the element to vary the temperature at which the movable arm is engaged and moved by the movable part of the element.

In testimony whereof I affix my signature.

EDWARD L. FONSECA.